(No Model.) 2 Sheets—Sheet 1.
F. A. BEMIS.
TRANSPLANTER.
No. 423,723. Patented Mar. 18, 1890.
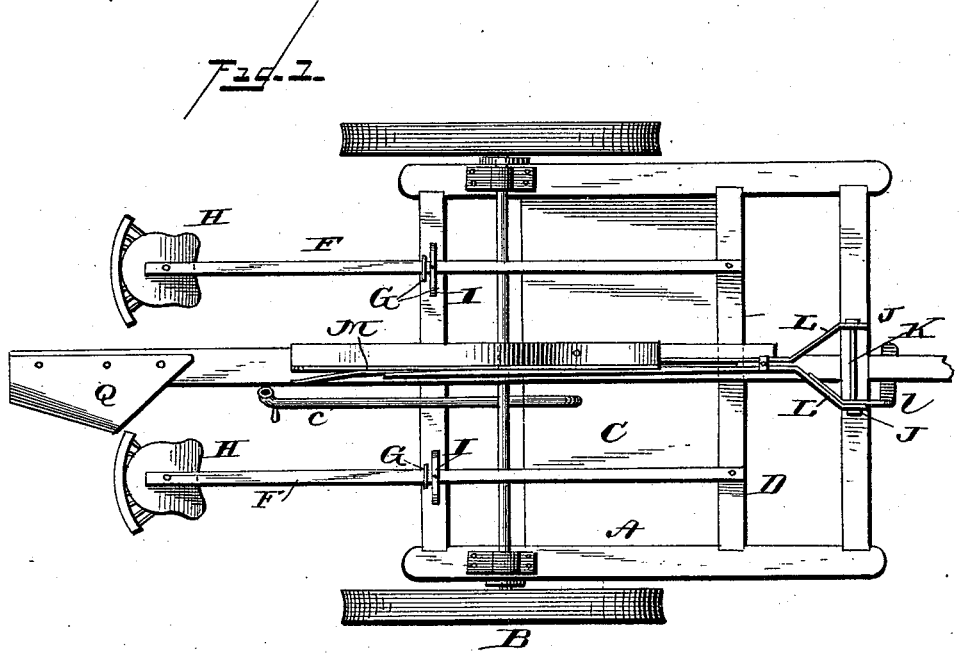
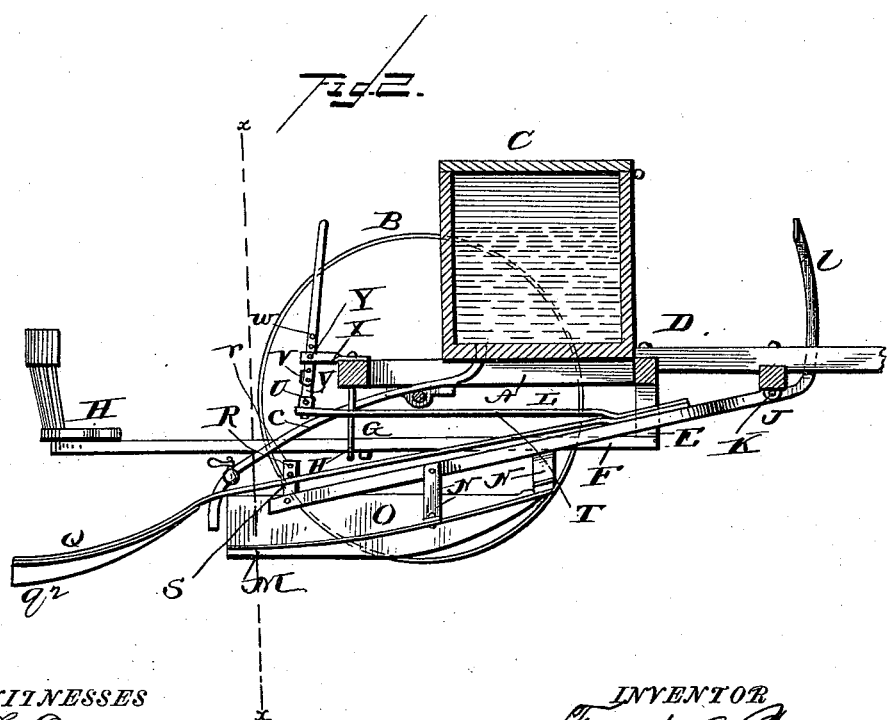
WITNESSES
F. L. Ourand
A. L. Morsell
INVENTOR
Frank A. Bemis
by J. Louis Daggett & Co.
Attorneys (No Model.) 2 Sheets—Sheet 2.
F. A. BEMIS.
TRANSPLANTER.
No. 423,723. Patented Mar. 18, 1890.
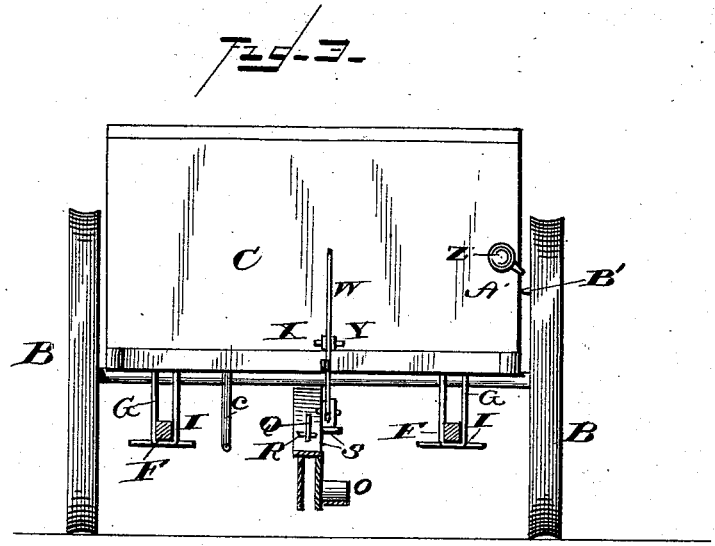
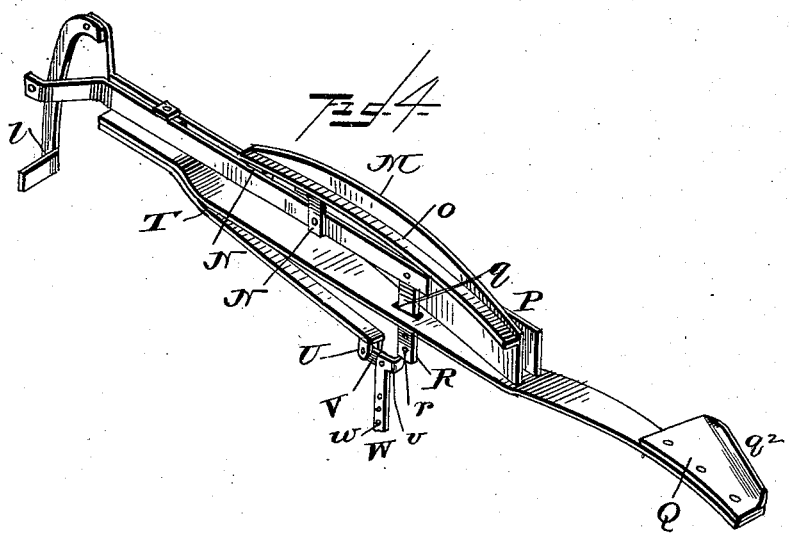
WITNESSES
P. L. Ourand
A. L. Morsell
INVENTOR
Frank A. Bemis,
by Ennis Dagger & Co,
Attorneys

UNITED STATES PATENT OFFICE.

FRANK A. BEMIS, OF DANE, WISCONSIN.

TRANSPLANTER.

SPECIFICATION forming part of Letters Patent No. 423,723, dated March 18, 1890.

Application filed June 15, 1889. Serial No. 314,385. (No model.)

*To all whom it may concern:*

Be it known that I, FRANK A. BEMIS, a citizen of the United States, and a resident of Dane, in the county of Dane and State of Wisconsin, have invented certain new and useful Improvements in Machines for Transplanting Plants; and I do hereby declare that the following is a full, clear, and exact description of the invention, which will enable others skilled in the art to which it appertains to make and use the same.

My invention has relation to improvements in machines for transplanting plants, more particularly tobacco, cabbage, and the like, by means of the mechanism hereinafter described, whereby persons suitably seated upon the vehicle are enabled to place the plants in a furrow or opening made for the purpose, the machine subsequently filling in the opening or furrow and compactly pressing the earth about the roots of the plant.

The particular objects of my invention are to provide a machine having improved facilities for smoothing and pressing the soil on one side of the furrows; furthermore, in means for covering the furrow in a simple and effective manner; furthermore, in providing mechanism whereby the depositors are enabled to deposit or place the plants at stated and regular intervals, and, furthermore, in various other details of construction, as hereinafter more fully set forth.

In the accompanying drawings, Figure 1 is a bottom plan view of my improved transplanting-machine. Fig. 2 is a longitudinal vertical sectional view. Fig. 3 is a cross-sectional view on line $x$ $x$, Fig. 2; and Fig. 4 is a detail view of the under side gathering and spreading plate.

Like letters of reference are used to denote corresponding parts throughout the entire specification and several views of the drawings.

Referring to the drawings, the letter A represents the rectangular frame or body of my improved transplanter, supported upon suitable guide-wheels B B and having a tank or reservoir C secured to the top thereof, said tank having extending rearwardly therefrom a water-pipe $c$. The rectangular frame is further provided near its forward end with a cross-beam D, having depending arms E E, to which are connected rearwardly-extending arms F F, which pass through suitable staples or loops G G, depending from the rear cross-piece of the frame, thereby perfecting a support for said arms. These arms are adapted to carry upon their rear ends suitable seats H H, upon which the operators or depositors sit in placing the plants within the furrow, and for the convenience or comfort of these persons I also provide the arms F F with foot-rests or stirrups I I.

The front cross-piece of the frame is provided with bolt or screw eyes J J, through which passes a transverse rod K, said rod also passing through the forward ends of supporting-bars L L, one of said bars being extended forwardly and then upwardly and formed upon its extremity with a treadle $l$, for the purpose hereinafter set forth. The forward ends of the supporting-bars are diverged or spread apart, so as to be hinged or pivoted upon opposite ends of the transverse rod K. They, however, converge as they extend rearwardly, and for the greater portion of their length run parallel and have a small intervening space, into which is adapted to be suitably secured the cutting runner or plow M.

Secured upon the outer side of one of the supporting-bars are angle-irons N N, the laterally-extending portion thereof having secured thereto a compressing plate or spring O, which presses or compacts the ground as the runner makes the incision, thereby, in conjunction with said runner, forming a smooth wall upon the land side, which stands firmly while the plant is being placed in position. Extending rearwardly at an oblique angle from the opposite side of the cutting-runner is the usual mold-board P.

A gathering and spreading plate Q is secured at its rear end upon the top edges of the supporting-bars, and is provided at a point near its center with an elongated aperture $q$, through which an upwardly-extending arm R, secured in the space between said supporting-bars, passes. This arm is provided with a series of apertures $r$, and by means of a transverse pin S the height of the gathering and spreading plate is regulated. The rear extremity of the gathering and spreading plate is formed or provided with an extension $q^2$, projecting laterally on the hill side of the furrow and having its outer edge bent downward. This extension effects the function of gathering the soil and filling the furrow after the incision has been made, while the flat portion of the plate spreads the soil and firmly compresses the same, thus completing the operation of planting.

Secured to and above the forward ends of the gathering and spreading plate is a spring T, having extending upward from the rear end thereof arms U, the upper ends of which articulate with the lower end of an arm V, which latter extends upward and articulates in turn with a vertical arm W, which passes through the bifurcated portion of a rearwardly-extending plate X, secured to the rear cross-piece of the frame. It will be noticed that the lower end of the arm V is provided with a stop or lug $v$, which prevents the toggle-joint formed by the connecting-arms from being thrown inward. The vertically-extending arm W is also provided with a series of perforations $w$, which are adapted to register with perforations in the bifurcated portion of the plate X and to be secured in an adjusted position by means of the transverse pin Y. By this construction a twofold purpose is attained—namely, first, the depth of the sled-runner may be either increased or decreased, as it is obvious that by raising the vertically-extended arm and securing it in its raised position the plow or runner will also be raised through the connecting gathering-plate and its spring, and, vice versa, the depth may be increased by simply lowering the vertically-extending arm, and, secondly, the tension of the spring T is increased by lowering the vertically-extending arm or decreased by raising the same within the bifurcated portion of the plate. In cutting into hard soil, or when it is necessary to make a deep incision, it is particularly desirable that the tension of the spring should be considerable, so as to afford the sled-runner a firm bearing in the soil.

Upon the rear side of the tank or reservoir C, near one edge thereof, is located a gong or alarm Z, the arm of the hammer A' thereof extending laterally and adapted to be tripped at certain intervals by lugs or cams B', arranged upon the inner side of one of the drive-wheels B, near the rim thereof. In this way the person seated upon the machine is enabled to deposit the plants at regular intervals, the alarm, through the medium of the lugs or cams engaging the arm of the hammer during the revolution of the wheel, indicating the proper distance. The pipe $c$, leading from the reservoir or tank, is for the purpose of supplying water to the furrow, so that the plant may be thoroughly moistened in dry weather or when the soil is particularly dry, thus insuring the growth of the plant. In the drawings I have shown the pipe adapted to pour a continuous stream of water into the furrow; but, if preferred, mechanism may be employed whereby the stream is made intermittent by employing a valve adapted to be opened or closed at regular intervals.

The treadle $l$ upon one of the supporting-bars L enables the driver by pressing down upon the same to elevate the sled-runner, so as to be out of contact with the soil, which is desirable when the machine is being removed from the field or in turning the same after completing a furrow.

The plants are usually set by boys or girls, each setting alternate plant, one with the right hand and the other with the left, thus planting as fast as the team walks.

The advantages claimed by me are the construction of the compressing plate or spring secured to the land side of the runner, which leaves a smooth perpendicular wall against which the plants are placed; also the construction and arrangement of the gathering and spreading plate, which has decided advantages over the rollers ordinarily used for the same purpose, inasmuch as in certain conditions of the soil—as, for instance, when damp or wet—the dirt will adhere to the wheel, thus to a certain extent impairing its effectiveness. This defect, however, is not apparent in the device substituted by me, which in this respect is a considerable improvement in the runner system of planting.

A further advantage consists in providing convenient mechanism whereby the depositors are enabled to place the plants at stated and regular intervals.

Having thus fully described my invention, what I claim as new, and desire to secure protection in by Letters Patent of the United States, is—

1. In a transplanting-machine, the combination, with the runner or plow provided with the usual mold-board, of the gathering and spreading plate formed or provided upon its end, on one side thereof, with a downwardly-extending flange, substantially as set forth.

2. In a transplanting-machine the combination, with the runner or plow provided with the usual mold-board, of the gathering and spreading plate formed or provided upon its end, on one side thereof, with a downwardly-extending flange, and the spring for regulating the pressure upon said plate, substantially as set forth.

3. In a transplanting-machine, the combination of the runner or plow provided with the usual mold-board, the smoothing or compressing plate secured to the land side of the runner and extending horizontally therefrom, the gathering and spreading plate, the spring for regulating the pressure upon said gathering and spreading plate, and the toggle-joint connection, by means of which said plow or runner may be lifted out of contact with the soil, substantially as set forth.

4. In a transplanting-machine, the combination of the runner or plow provided with the usual mold-board, the smoothing and compressing plate secured to the landside of the runner and extending horizontally, therefrom the gathering and spreading plate, the spring for regulating the pressure upon said gathering and spreading plate, and the vertically-adjustable toggle-joint connection, substantially as set forth.

5. In a transplanting-machine, the combination of the frame, the rearwardly-extending pivoted and parallel supporting-bars, the runner or plow secured between said bars and provided with the usual mold-board, the angle-irons, and the compressor-plate secured to said angle-irons and extending horizontally from the runner, substantially as set forth.

6. In a transplanting-machine, the combination of the frame, the rearwardly-extending pivoted and parallel supporting-bars, the runner or plow secured between said bars and provided with the usual mold-board, the compressing-plate secured to the land side of the runner and extending horizontally therefrom, the vertically-extending perforated arm, the gathering and spreading plate provided with an elongated aperture through which said vertically-extending arm passes, and the transverse pin or bolt, substantially as set forth.

7. In a transplanting-machine, the combination of the frame, the rearwardly-extending pivoted supporting-bars, the runner or plow secured between said bars and provided with the usual mold-board, the compressing-plate, the gathering and spreading plate, the regulating-spring provided on its rear end with an upwardly-extending bifurcated arm, the arm pivotally connected thereto and provided on its lower end with a stop or shoulder and on its upper end with a series of perforations, the plate secured to the rear cross-piece of the frame and provided with bifurcated rear portion, and the transverse pin or bolt, substantially as set forth.

8. In a transplanting-machine, the combination of the frame, the rearwardly-extending pivoted supporting-bars, one of said bars extending outwardly and then upwardly and formed or provided on its extremity with a treadle, the runner or plow secured between said bars and provided with the usual mold-board, the compressing-plate, the gathering and spreading plate, the regulating-spring, and the toggle-joint connection, substantially as set forth.

In testimony that I claim the foregoing as my own I have hereunto affixed my signature in presence of two witnesses.

FRANK A. BEMIS.

Witnesses:
A. E. PROUDFIT,
H. G. RINDER.